US008970564B2

(12) United States Patent
Moon et al.

(10) Patent No.: US 8,970,564 B2
(45) Date of Patent: Mar. 3, 2015

(54) APPARATUS AND METHOD FOR DRIVING LIQUID CRYSTAL DISPLAY

(75) Inventors: Su-Hwan Moon, Gumi-si (KR); Ji-Eun Chae, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 717 days.

(21) Appl. No.: 12/484,372

(22) Filed: Jun. 15, 2009

(65) Prior Publication Data

US 2010/0156947 A1 Jun. 24, 2010

(30) Foreign Application Priority Data

Dec. 23, 2008 (KR) ........................ 10-2008-0132250

(51) Int. Cl.
*G06F 3/038* (2013.01)
*G09G 5/00* (2006.01)
*G09G 5/10* (2006.01)
*G09G 3/36* (2006.01)

(52) U.S. Cl.
CPC .......... *G09G 3/3648* (2013.01); *G09G 2310/02* (2013.01); *G09G 2310/0297* (2013.01)
USPC ............................ 345/204; 345/209; 345/690

(58) Field of Classification Search
USPC ..................... 345/204, 76, 87–90, 92, 94, 96, 345/98–100, 104, 205, 206, 209, 211, 214, 345/690
See application file for complete search history.

(56) References Cited

U.S. PATENT DOCUMENTS 5,436,635 A 7/1995 Takahara et al.
5,850,269 A * 12/1998 Kim ................................ 349/15
7,965,286 B2 * 6/2011 Ryu et al. ...................... 345/209
2006/0169979 A1 * 8/2006 Endo ............................... 257/59
2006/0232519 A1 * 10/2006 DuHwan et al. ................ 345/76
2007/0091044 A1 4/2007 Park et al.
2007/0165149 A1 * 7/2007 Kim et al. ....................... 349/39
2007/0285370 A1 * 12/2007 Kim ................................ 345/92
2008/0001889 A1 1/2008 Chun et al.
2008/0068516 A1 * 3/2008 Mori et al. .................... 348/790
2008/0100601 A1 5/2008 Moon et al.
2008/0129652 A1 6/2008 Park
2008/0204390 A1 * 8/2008 Moon ............................. 345/87
2008/0218647 A1 9/2008 Park
2008/0224980 A1 * 9/2008 Senda et al. .................... 345/96
2009/0168004 A1 7/2009 Kim et al.

FOREIGN PATENT DOCUMENTS

CN 101004520 A 7/2007
CN 101093304 A 12/2007
CN 101105585 A 1/2008
CN 101216650 A 7/2008
JP 2006-235609 A 9/2006
JP 2008-70763 A 3/2008
KR 10-2007-0075686 A 7/2007

* cited by examiner

*Primary Examiner* — Andrew Sasinowski
*Assistant Examiner* — Nguyen H Truong
(74) *Attorney, Agent, or Firm* — Birch, Stewart, Kolasch & Birch, LLP

(57) ABSTRACT

Disclosed herein are an apparatus and method for driving a liquid crystal display device. The apparatus includes a liquid crystal panel in which the same colors of three-color sub-pixels are arranged in the directions of a plurality of gate lines, a data driver for driving a plurality of data lines, a first gate driver for sequentially driving (4n−3)th and (4n)th gate lines among the gate lines during odd frame periods, a second gate driver for sequentially driving (4n−2)th and (4n−1)th gate lines among the gate lines during even frame periods, and a timing controller for generating different first and second gate control signals and a data control signal according to odd and even frame periods to supply the first and second gate control signals and the data control signal to the first and second gate drivers and the data driver, respectively.

6 Claims, 8 Drawing Sheets

APPARATUS AND METHOD FOR DRIVING LIQUID CRYSTAL DISPLAY

This application claims the benefit of Korean Patent Application No. 10-2008-0132250, filed on Dec. 23, 2008, which is hereby incorporated by reference as if fully set forth herein.

BACKGROUND OF THE INVENTION

1. Field of the Invention

The present invention relates to a liquid crystal display device, and more particularly, to an apparatus and method for driving a liquid crystal display device, which can reduce the number of data driving integrated circuits and compensate for the amount of data charge in a liquid crystal panel to improve picture quality and to reduce power consumption.

2. Discussion of the Related Art

A liquid crystal display device displays images using electro-optical characteristics of a liquid crystal. The liquid crystal shows anisotropic properties having different refractive indexes and different dielectric constants according to long-axis and short-axis directions of molecules and molecule arrangement and optical properties thereof can be easily controlled. The liquid crystal display device using the liquid crystal adjusts the transmittance of light passing through a polarizer by varying the orientation of liquid crystal molecules according to the strength of an electric field, thereby displaying images.

The liquid crystal display device includes a liquid crystal panel including a plurality of pixels arranged in a matrix, a gate driver driving gate lines of the liquid crystal panel, and a data driver driving data lines of the liquid crystal panel.

Each pixel of the liquid crystal panel expresses a desired color by a combination of red, green, and blue sub-pixels that control light transmittance according to a data signal. Each sub-pixel includes a thin film transistor ("TFT") connected to a gate line and to a data line, and a liquid crystal capacitor connected to the TFT. The liquid crystal capacitor charges a difference voltage between a data signal supplied to a pixel electrode through the TFT and a common voltage supplied to a common electrode and drives liquid crystal according to the charged voltage, thereby controlling light transmittance.

The gate driver includes a plurality of gate integrated circuits ("ICs") which sequentially drive the gate lines of the liquid crystal panel.

The data driver includes a plurality of data ICs which convert a digital data signal into an analog data signal whenever the gate lines are driven and supply the analog data signal to the data lines of the liquid crystal panel.

The data ICs include a complicated circuit construction, such as a digital-to-analog converter, that increases manufacturing costs. Further, since the number of data lines of the liquid crystal panel is larger than the number of gate lines thereof, more data ICs than gate ICs are required. To reduce the manufacturing costs of the liquid crystal display device, a method for reducing the number of data ICs while maintaining a resolution of the liquid crystal panel has been considered.

For example, a liquid crystal panel which halves the number of data lines using a structure in which odd and even sub-pixels located at both sides of one data line are sequentially driven using the data line has been proposed to reduce the number of the data ICs.

However, although the number of the data ICs is halved by locating the odd and even sub-pixels at both sides of one data line, the amount of data charge is also halved due to time division driving. Therefore, picture defects, such as spots on horizontal lines or vertical lines, are generated. Recently, as display devices become ever larger, a liquid crystal display device, which can prevent defects of picture quality while reducing the number of data ICs below that in a conventional structure in which the number of the data ICs is halved, has been strongly demanded.

SUMMARY OF THE INVENTION

Accordingly, the present invention is directed to an apparatus and method for driving a liquid crystal display device that substantially obviates one or more problems due to limitations and disadvantages of the related art.

An object of the present invention is to provide an apparatus and method for driving a liquid crystal display device, which can improve display quality by compensating for the amount of data charge in a liquid crystal panel while reducing the number of data driving ICs and can reduce dissipated power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving a liquid crystal display device includes a liquid crystal panel in which the same colors of three-color sub-pixels are arranged in the directions of a plurality of gate lines, three colors are alternately arranged in the directions of a plurality of data lines, and sub-pixels arranged in an odd column and sub-pixels arranged in an even column corresponding to the odd column are commonly connected to one data line, a data driver for driving the plurality of data lines, a first gate driver for sequentially driving (4n−3)th and (4n)th gate lines among the gate lines during odd frame periods, a second gate driver for sequentially driving (4n−2)th and (4n−1)th gate lines among the gate lines during even frame periods, and a timing controller for arranging externally input image data according to odd and even frame periods to supply the arranged data to the data driver, and generating different first and second gate control signals and a data control signal according to odd and even frame periods to supply the first and second gate control signals and the data control signal to the first and second gate drivers and the data driver, respectively.

The (4n−3)th and (4n−2)th gate lines may form one pair, and the (4n−1)th and (4n)th gate lines may form another pair to arrange the plurality of sub-pixels between the (4n−3)th gate line and the (4n−2)th gate line, and between the (4n−1)th gate line and the (4n)th gate line.

Sub-pixels of odd columns located in odd rows among the sub-pixels may be connected to the (4n−3)th gate line, sub-pixels of odd columns located in even rows may be connected to the (4n−1)th gate line, sub-pixels of even columns located in odd rows may be connected to the (4n−2)th gate line, and sub-pixels of even columns located in even rows may be connected to the (4n)th gate line.

Each of odd gate lines and each of even gate lines may form a pair, each of sub-pixels of the same color constituting one horizontal row may be arranged between each odd gate line and each even gate line constituting each pair, sub-pixels of odd columns located in odd rows and sub-pixels of even columns located in even rows may be connected to the odd gate lines, and sub-pixels of even columns located in odd rows and sub-pixels of odd columns located in even rows may be connected to the even gate lines.

The first gate driver may sequentially drive the odd gate lines among the gate lines during the odd frame periods, and the second gate driver may sequentially drive the even gate lines among the gate lines during the even frame periods.

The liquid crystal panel may be driven by an inversion driving mode for odd and even frames in which polarity of data is inverted in units of odd and even frames to invert the polarity of data according to each frame period during the odd and even frame periods.

In another aspect of the present invention, a method for driving a liquid crystal display device including a liquid crystal panel in which the same colors of three-color sub-pixels are arranged in the directions of a plurality of gate lines, three colors are alternately arranged in the directions of a plurality of data lines, and sub-pixels arranged in an odd column and sub-pixels arranged in an even column corresponding to the odd column are commonly connected to one data line, includes driving the plurality of data lines, sequentially driving (4n−3)th and (4n)th gate lines among the gate lines during odd frame periods, sequentially driving (4n−2)th and (4n−1)th gate lines among the gate lines during even frame periods, and arranging externally input image data according to odd and even frame periods to supply the arranged data to a data driver and generating different first and second gate control signals and a data control signal according to odd and even frame periods to supply the first and second gate control signals and the data control signal to first and second gate drivers and the data driver, respectively.

The (4n−3)th and (4n−2)th gate lines may form one pair, and the (4n−1)th and (4n)th gate lines may form another pair to arrange the plurality of sub-pixels between the (4n−3)th gate line and the (4n−2)th gate line, and between the (4n−1)th gate line and the (4n)th gate line. Sub-pixels of odd columns located in odd rows among the sub-pixels may be connected to the (4n−3)th gate line, sub-pixels of odd columns located in even rows may be connected to the (4n−1)th gate line, sub-pixels of even columns located in odd rows may be connected to the (4n−2)th gate line, and sub-pixels of even columns located in even rows may be connected to the (4n)th gate line.

Each of odd gate lines and each of even gate lines may form a pair, each of sub-pixels of the same color constituting one horizontal row may be arranged between each odd gate line and each even gate line constituting each pair, sub-pixels of odd columns located in odd rows and sub-pixels of even columns located in even rows may be connected to the odd gate lines, and sub-pixels of even columns located in odd rows and sub-pixels of odd columns located in even rows may be connected to the even gate lines.

The driving of the plurality of gate lines include sequentially driving the odd gate lines among the gate lines during the odd frame periods, and sequentially driving the even gate lines among the gate lines during the even frame periods.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings.

Figure 1:
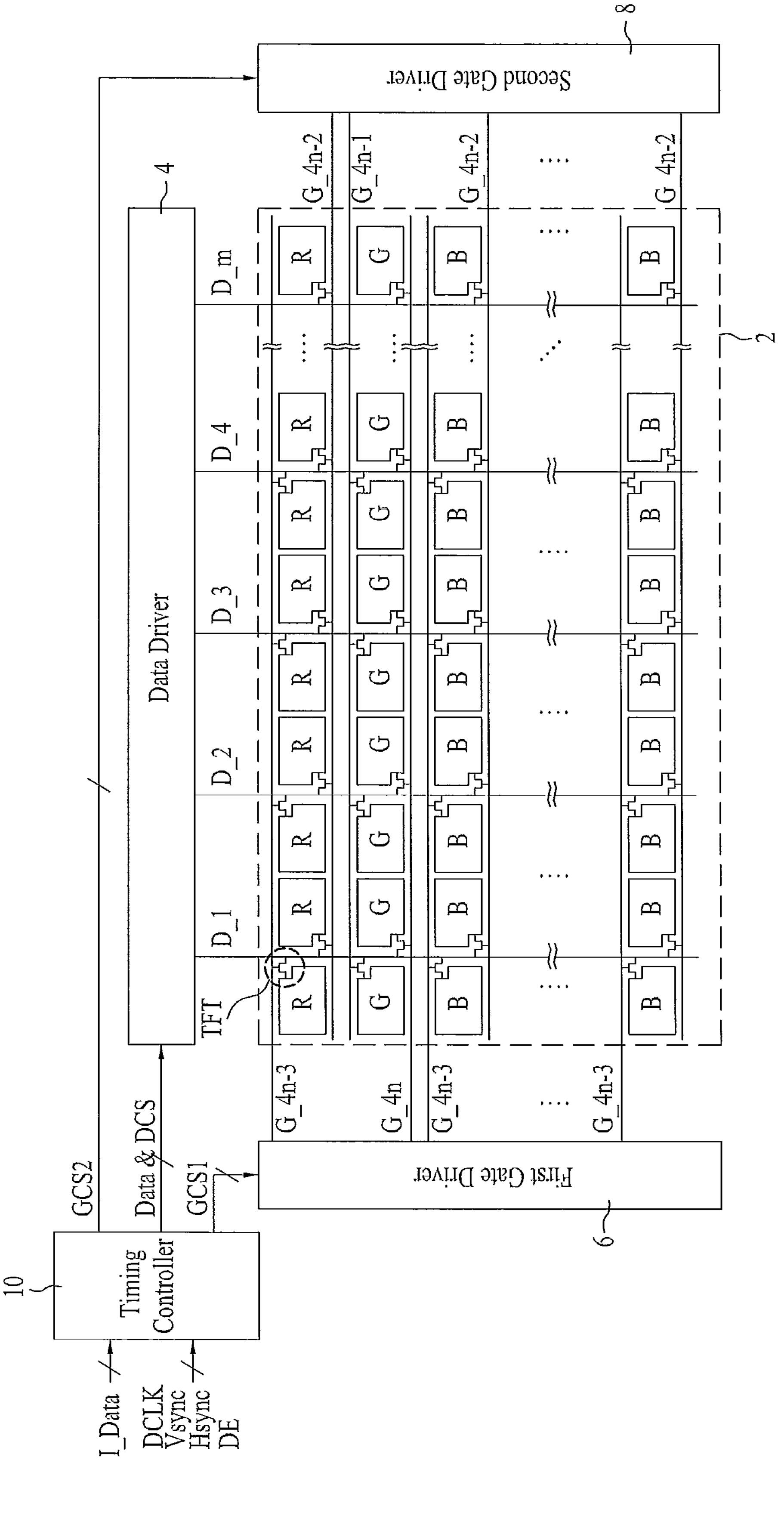
FIG. 1 illustrates the construction of a liquid crystal display device according to a first exemplary embodiment of the present invention.

FIG. 1 illustrates the construction of a liquid crystal display device according to a first exemplary embodiment of the present invention.

Referring to FIG. 1, the liquid crystal display device includes a liquid crystal panel 2, a data driver 4, a first gate driver 6, a second gate driver 8, and a timing controller 10. In the liquid crystal panel 2, three sub-pixels R, G, and B are configured such that the same colors are arranged in the directions of a plurality of gate lines G_4n−3, G_4n−1, G_4n−2, and G_4n, three colors are alternately arranged in the directions of a plurality of data lines D_1 to D_m, and sub-pixels arranged in an odd column and sub-pixels arranged in an even column corresponding to the odd column are commonly connected to one data line. The data driver 4 drives the plurality of data lines D_1 to D_m provided in the liquid crystal panel 2. The first gate driver 6 sequentially drives the (4n−3)th and (4n)th gate lines G_4n−3 and G_4n among the gate lines G_4n−3, G_4n−2, G_4n−1, and G_4n during odd frame periods. The second gate driver 8 sequentially drives the (4n−2)th and (4n−1)th gate lines G_4n−2 and G_4n−1 among the gate lines G_4n−3, G_4n−2, G_4n−1, and G_4n during even frame periods. The timing controller 10 arranges externally input image data I_Data according to odd and even frame periods to supply the arranged data to the data driver 4, and generates different first and second gate control signals GCS1 and GCS2 and a data control signal DCS according to odd and even frame periods to supply the gate control signals GCS1 and GCS2 and the data control signal DCS to the first and second gate drivers 6 and 8 and the data driver 4, respectively.

A plurality of sub-pixels constituting a pixel matrix of the liquid crystal panel 2 are divided into red, green, and blue sub-pixels R, G, and B and are formed in regions defined by the plurality of data line D_1 to D_m and the plurality of gate lines G_4n−3, G_4n−2, G_4n−1, and G_4n.

In the first exemplary embodiment of the present invention, the (4n−3)th and (4n−2)th gate lines G_4n−3 and G_4n−2 form one pair, and the (4n−1)th and (4n)th gate lines G_4n−1 and G_4n form another pair. Thus the plurality of sub-pixels R, G, and B are arranged between the (4n−3)th gate line G_4n−3 and the (4n−2)th gate line G_4n−2, and between the (4n−1)th gate line G_4n−1 and the (4n)th gate line G_4n. Here, 'n' is a natural number equal to or greater than 1 .

Sub-pixels of odd columns located in odd rows are connected to the (4n−3)th gate line G_4n−3 and sub-pixels of odd columns located in even rows are connected to the (4n−1)th gate line G_4n−1 . Sub-pixels of even columns located in odd rows are connected to the (4n−2)th gate line G_4n−2 and sub-pixels of even columns located in even rows are connected to the (4n)th gate line G_4n.

Each of the data lines D_1 to D_m is commonly connected to sub-pixels of an odd column and an even column located at both sides thereof. More specifically, each of the data lines D_1 to D_m is connected through corresponding TFTs to sub-pixels of an odd column located adjacently on the left thereof and is connected through corresponding TFTs to sub-pixels of an even column located adjacently on the right side thereof. The three colors R, G, and B of the sub-pixels are repeatedly arranged in the directions of the data lines D_1 to D_m and the same colors are arranged in the directions of the gate lines G_4n−3, G_4n−2, G_4n−1, and G_4n. Therefore, sub-pixels of an odd column connected to one data line are connected to the odd gate lines G_4n−3 and G_4n−1 through corresponding TFTs. Sub-pixels of an even column connected to one data line are connected to the even gate lines G_4n−2 and G_4n through corresponding TFTs. Namely, the sub-pixels of the odd and even columns connected to one data line are driven in units of an odd or even frame. A pair of sub-pixels connected to the same data line in a horizontal row arranged by the same color, that is, a sub-pixel of an odd column and a sub-pixel of an even column in a horizontal row arranged by the same color are connected to a pair of gate lines G_4n−3 and G_4n−2, or a pair of gate lines G_4n−1 and G_4n and are sequentially driven in units of an even or odd frame.

To reduce power consumption, the liquid crystal panel 2 shown in FIG. 1 is driven by an inversion driving mode for odd and even frames in which polarity of data is differently inverted in units of odd and even frames. Then, sub-pixels connected to the odd gate lines G_4n−3 and G_4n−1 charge data of the same polarity during odd frame periods and sub-pixels connected to the even gate lines G_4n−2 and G_4n charge data of the same polarity during even frame periods. The polarity of data is inverted according to each frame period during odd and even frame periods. As described above, in the present invention, while power consumption can be reduced by inversion of the data polarity of a frame unit according to odd and even frames, the liquid crystal panel 2 is visually recognized as being driven by a one-dot inversion mode according to the arrangement of the sub-pixels R, G, and B and the gate lines G_4n−3, G_4n−2, G_4n−1, and G_4n. Therefore, the liquid crystal panel 2 of the present invention and a driving method thereof can improve picture quality while reducing power consumption.

The data driver 4 converts image data Data, arranged in units of odd and even frames from the timing controller 10, into an analog voltage, that is, an image signal, using the data control signal DCS received from the timing controller 10, that is, using a source start pulse (SSP), a source shift clock (SSC), a source output enable (SOE) signal, etc.

More specifically, the data driver 4 latches the image data Data of an odd or even frame, input according to the SSC, and supplies, to the gate lines D_1 to D_m in response to the SOE signal, the image signal corresponding to one horizontal line at one horizontal period during which a scan pulse is supplied. In this case, the data driver 4 selects a gamma voltage of positive polarity (+) or negative polarity (−) having a prescribed level according to a gray level of the arranged image data in response to a polarity control signal from the timing controller 10 and supplies the selected gamma voltage to the data lines D_1 to D_m as the image signal. As described above, the data driver 4 supplies the image signal of positive polarity (+) or negative polarity (−) to the data lines D_1 to D_m so that the data polarity of the sub-pixels R, G, and B of the liquid crystal panel 2 is inverted according to each frame during each frame period of odd and even frame periods.

The first gate driver 6 sequentially generates a scan pulse in response to the first gate control signal GCS1, which is input every odd frame period from the timing controller 10, for example, in response to a gate start pulse (GSP), a gate shift clock (GSC), and a gate output enable (GOE) signal. The first gate driver 6 sequentially supplies the sequentially generated scan pulse to the (4n−3)th and (4n)th gate lines G_4n−3 and G_4n connected thereto. In other words, the first gate control signal GCS1 is supplied to the first gate driver 6 only during odd frame periods among frame periods. The first gate driver 6 shifts the GSP according to the GSC during every odd frame period in response to the first gate control signal GCS1 and sequentially supplies a scan pulse, for example, a gate-on voltage to the (4n−3)th and (4n)th gate lines G_4n−3 and G_4n. During periods when the gate-on voltage is not supplied to the (4n−3)th and (4n)th gate lines G_4n−3 and G_4n, the first gate driver 6 supplies a gate-off voltage. At this time, the first gate driver 6 controls a width of the scan pulse according to the GOE signal.

The second gate driver 8 sequentially generates a scan pulse in response to the second gate control signal GCS2, which is input every even frame period from the timing controller 10, for example, in response to a GSP, a GSC, and a GOE signal. The second gate driver 8 sequentially supplies the sequentially generated scan pulse, for example, a gate-on voltage to the (4n−2)th and (4n−1)th gate lines G_4n−2 and G_4n−1 connected thereto. Specifically, the second gate control signal GCS2 is supplied to the second gate driver 8 only during even frame periods. The second gate driver 8 shifts the GSP according to the GSC during every even frame period in response to the second gate control signal GCS2 and sequentially supplies the gate-on voltage to the (4n−2)th and (4n−1)th gate lines G_4n−2 and G_4n−1 . During periods when the gate-on voltage is not supplied to the (4n−2)th and (4n−1)th gate lines G_4n−2 and G_4n−1, the second gate driver 8 supplies a gate-off voltage. At this time, the second gate driver 8 controls a width of the scan pulse according to the GOE signal.

The timing controller 10 arranges the externally input image data I_Data to be suitable for driving the liquid crystal panel 2 and supplies the image data I_Data to the data driver 4 according to odd and even frames. Specifically, the timing controller 10 arranges image data which is to be displayed during odd frames among the input image data I_Data, that is, image data displayed during odd frames through the sub-pixels connected to the (4n−3)th and (4n)th gate lines G_4n−3 and G_4n and supplies the arranged data to the data driver 4 so that the data can be displayed during the odd frames. Moreover, the timing controller 10 arranges image data which is to be displayed during even frames among the input image data I_Data, that is, image data displayed during even frames through the sub-pixels connected to the (4n−2)th and (4n−1)th gate lines G_4n−2 and G_4n−1 and supplies the arranged data to the data driver 4 so that the data can be displayed during the even frames.

The timing controller 10 generates the data control signal DCS together with the first and second gate control signals GCS1 and GCS2, using at least one externally input synchronous signal, that is, a dot clock DCLK, a data enable signal DE, a horizontal synchronous signal Hsync, and a vertical synchronous signal Vsync. Thereafter, the timing controller 10 supplies the data control signal DCS along with the first and second gate control signals GCS1 and GCS2 to the data driver 4 along with the first and second gate drivers 6 and 8 and controls the data driver 4 along with the first and second gate drivers 6 and 8.

More specifically, the timing controller 8 generates the data control signal DCS together with the first gate control signal GCS1 during odd frame periods, and supplies the first gate control signal GCS1 and the data control signal DCS to the first gate driver 6 and the data driver 4, respectively. At this time, at least one second gate control signal GCS2, for example, the GSP is not supplied to the second gate driver 8 so that the second gate driver 8 transitions to a standby state. Meanwhile, the timing controller 10 generates the data control signal DCS together with the second gate control signal GCS2 during even frame periods, and supplies the second gate control signal GCS2 and the data control signal DCS to the second gate driver 8 and the data driver 4, respectively. At this time, at least one first gate control signal GCS1, for example, the GSP is not supplied to the first gate driver 6 so that the first gate driver 6 transitions to a standby state.

Figure 2:
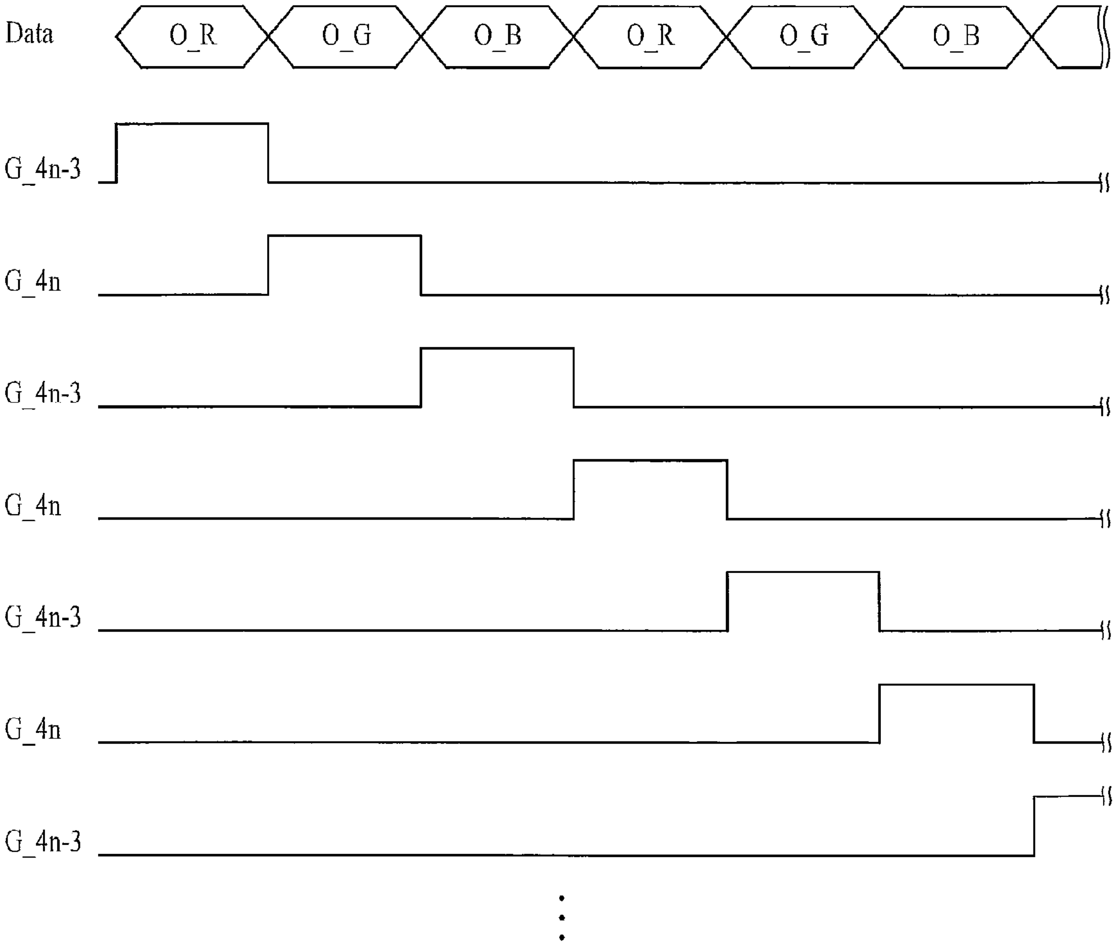
FIG. 2 is waveform charts explaining a driving method during odd frame periods.
Figure 3:
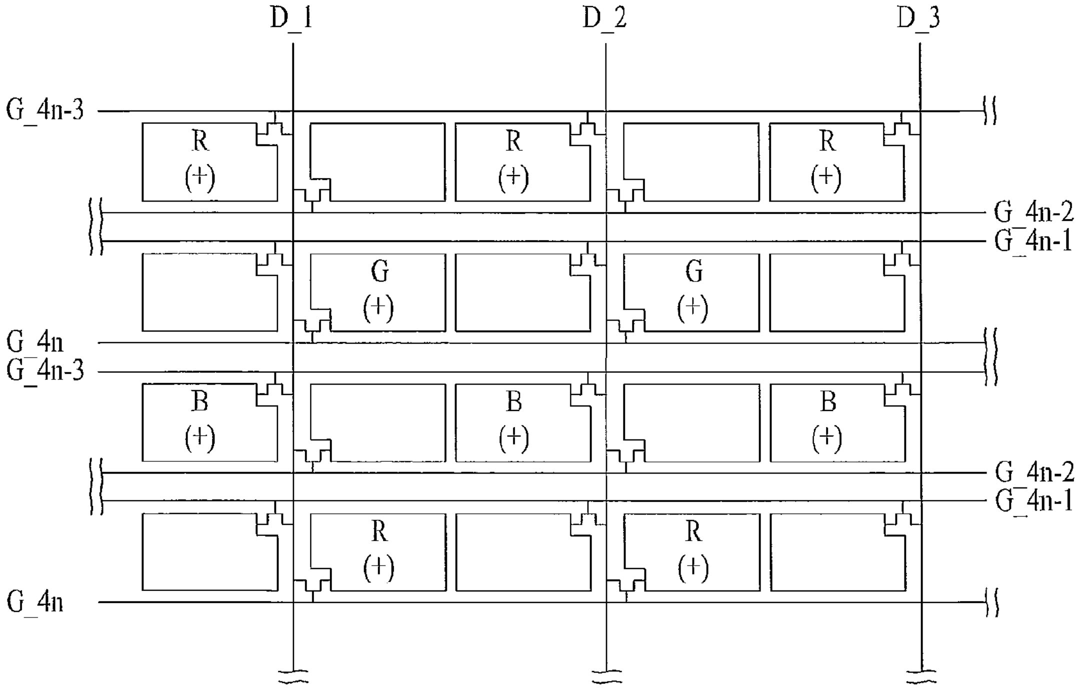
FIG. 3 illustrates sub-pixels data-charged during odd frame periods.

FIG. 2 is waveform charts explaining a driving method during odd frame periods. FIG. 3 illustrates sub-pixels data-charged during odd frame periods.

To display images during odd frame periods, the timing controller 10 arranges image data displayed during odd frame periods and supplies the arranged image data to the data driver 4 in units of at least one horizontal line, as illustrated in FIGS. 2 and 3. The timing controller 10 generates the first gate control signal GCS1 and the data control signal DCS and supplies the signals GCS1 and DCS to the first gate driver 6 and the data driver 4, respectively.

The data driver 4 converts the image data to be displayed during odd frame periods into analog image signals and supplies the analog image signals to the data lines D_1 to D_m in units of every horizontal period. The first gate driver 6 sequentially supplies a gate-on voltage to the (4n−3)th and (4n)th gate lines G_4n−3 and G_4n during odd frame periods in response to the first gate control signal GCS1. The first gate driver 6 sequentially supplies a gate-off voltage to the (4n−3)th and (4n)th gate lines G_4n−3 and G_4n during periods when the gate-on voltage is not supplied.

Then, as shown in FIG. 3, sub-pixels to which the gate-on voltage is supplied through the (4n−3)th gate line G_4n−3 among sub-pixels R arranged in a horizontal row of the uppermost stage charge a red image signal O_R supplied to the data lines D_1 to D_m. Next, sub-pixels to which the gate-on voltage is supplied through the (4n)th gate line G_4n among sub-pixels G arranged in a horizontal row of the second stage charge a green image signal O_G supplied to the data lines D_1 to D_m. Thereafter, sub-pixels to which the gate-on voltage is supplied through the (4n−3)th gate line G_4n−3 among sub-pixels B arranged in a horizontal row of the third stage charge a blue image signal O_B supplied to the data lines D_1 to D_m. In this way, during odd frame periods, sub-pixels connected to the (4n−3)th and (4n)th gate lines G_4n−3 and G_4n to which the gate-on voltage is sequentially supplied charge the image signals O_R, O_G, and O_B of odd frames sequentially, thereby displaying images.

Figure 4:
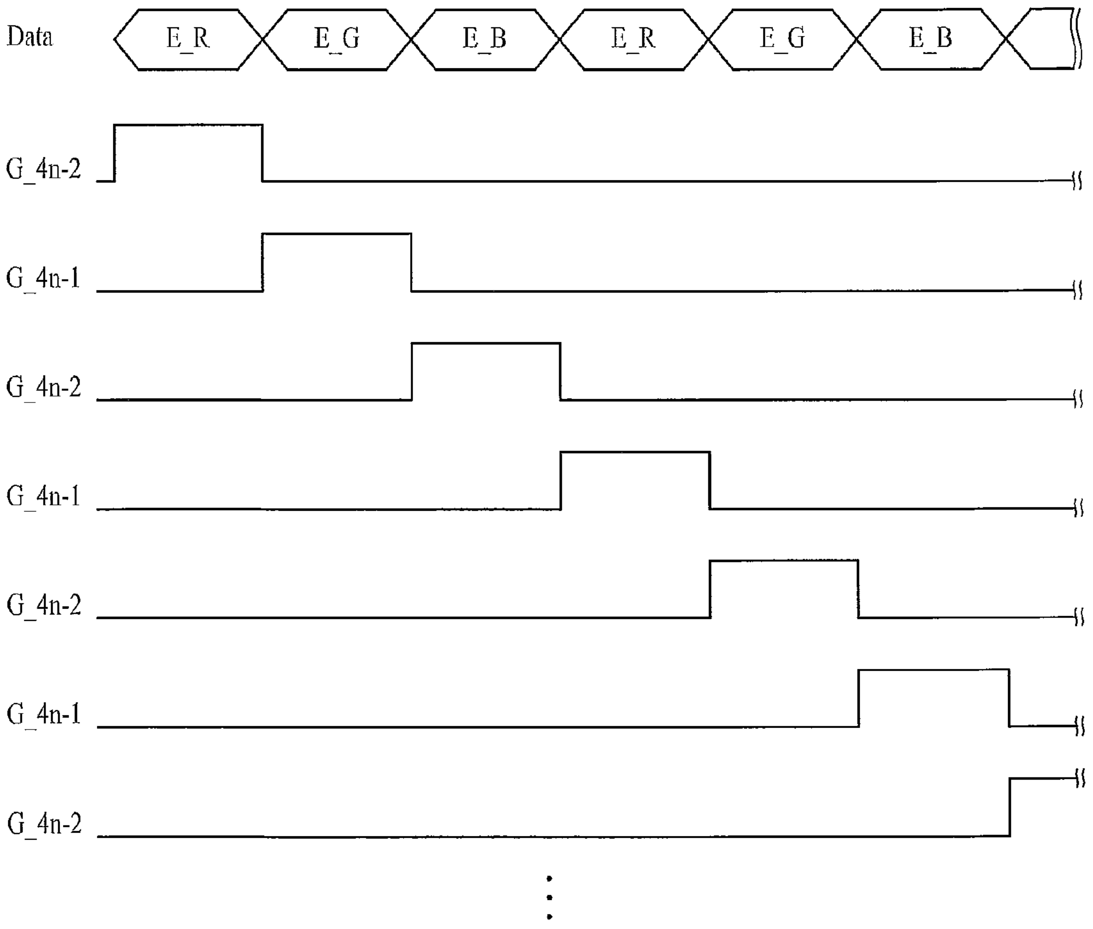
FIG. 4 is waveform charts explaining a driving method during even frame periods.
Figure 5:
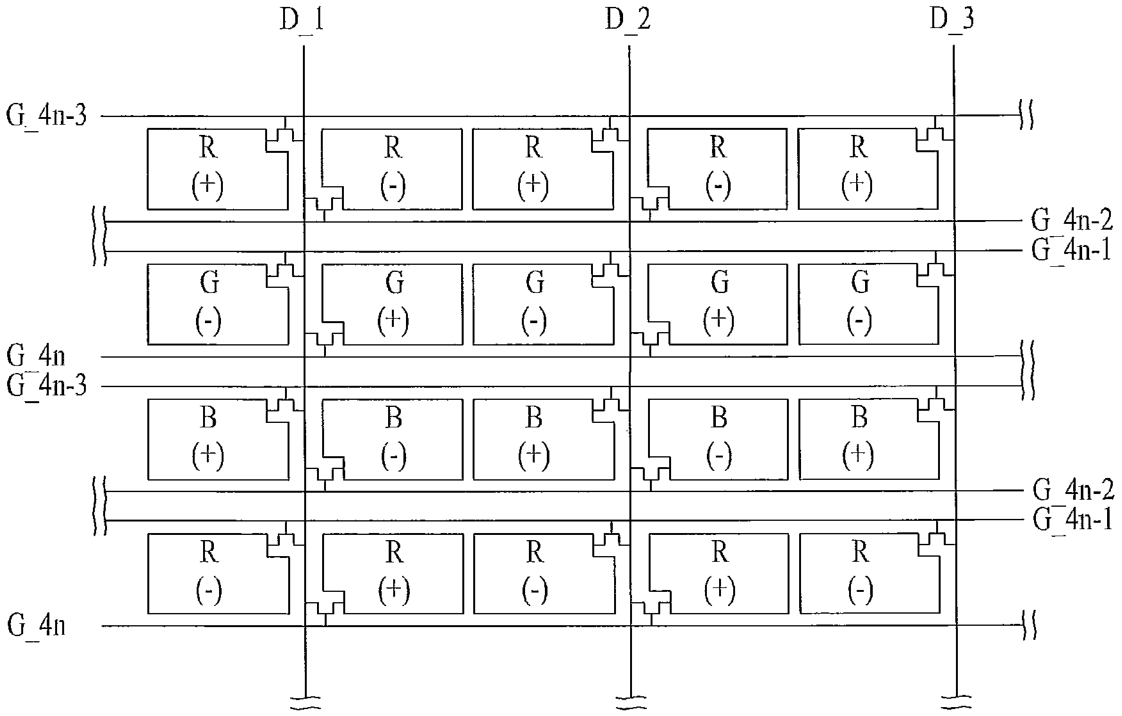
FIG. 5 illustrates sub-pixels data-charged during even frame periods.

FIG. 4 is waveform charts explaining a driving method during even frame periods. FIG. 5 illustrates sub-pixels data-charged during even frame periods.

To display images during even frame periods, the timing controller 10 arranges image data displayed during even frame periods and supplies the arranged image data to the data driver 4 in units of at least one horizontal line, as illustrated in FIGS. 4 and 5. The timing controller 10 generates the second gate control signal GCS2 and the data control signal DCS, and supplies the signals GCS2 and DCS to the second gate driver 8 and the data driver 4, respectively.

The data driver 4 converts the image data E_R, E_G, and E_B to be displayed during even frame periods into analog image signals and supplies the analog image signals to the data lines D_1 to D_m in units of every horizontal period. The second gate driver 8 sequentially supplies a gate-on voltage to the (4n−2)th and (4n−1)th gate lines G_4n−2 and G_4n−1 during even frame periods in response to the second gate control signal GCS2. The second gate driver 8 sequentially supplies a gate-off voltage to the (4n−2)th and (4n−1)th gate lines G_4n−2 and G_4n−1 during periods when the gate-on voltage is not supplied.

Then, as shown in FIG. 5, sub-pixels to which the gate-on voltage is supplied through the (4n−2)th gate line G_4n−2 among sub-pixels R arranged in a horizontal row of the uppermost stage charge a red image signal E_R supplied to the data lines D_1 to D_m. Next, sub-pixels to which the gate-on voltage is supplied through the (4n−1)th gate line G_4n−1 among sub-pixels G arranged in a horizontal row of the second stage charge a green image signal E_G supplied to the data lines D_1 to D_m. Thereafter, sub-pixels to which the gate-on voltage is supplied through the (4n−2)th gate line G_4n−2 among sub-pixels B arranged in a horizontal row of the third stage charge a blue image signal E_B supplied to the data lines D_1 to D_m. In this way, during even frame periods, sub-pixels connected to the (4n−2)th and (4n−1)th gate lines G_4n−2 and G_4n−1 to which the gate-on voltage is sequentially supplied charge the image signals E_R, E_G, and E_B of even frames sequentially, thereby displaying images.

As described above, the liquid crystal display device according to the first exemplary embodiment of the present invention is constructed such that the sub-pixels R, G, and B included in the liquid crystal panel 2 have the same color in the directions of the gate lines G_4n−3, G_4n−1, and G_4n−2, G_4n, the three colors are alternately arranged in the directions of data lines D_1 to D_m, and sub-pixels arranged in an odd column and sub-pixels arranged in an even column corresponding to the odd column share one data line. Accordingly, the number of data driving ICs constituting the data driver 4 can be reduced to one third to one sixth that of a conventional liquid crystal panel. In addition, since an effect of performing a dot inversion mode is obtained while performing a frame inversion mode, power consumption is reduced and display quality can be greatly improved.

Figure 6:
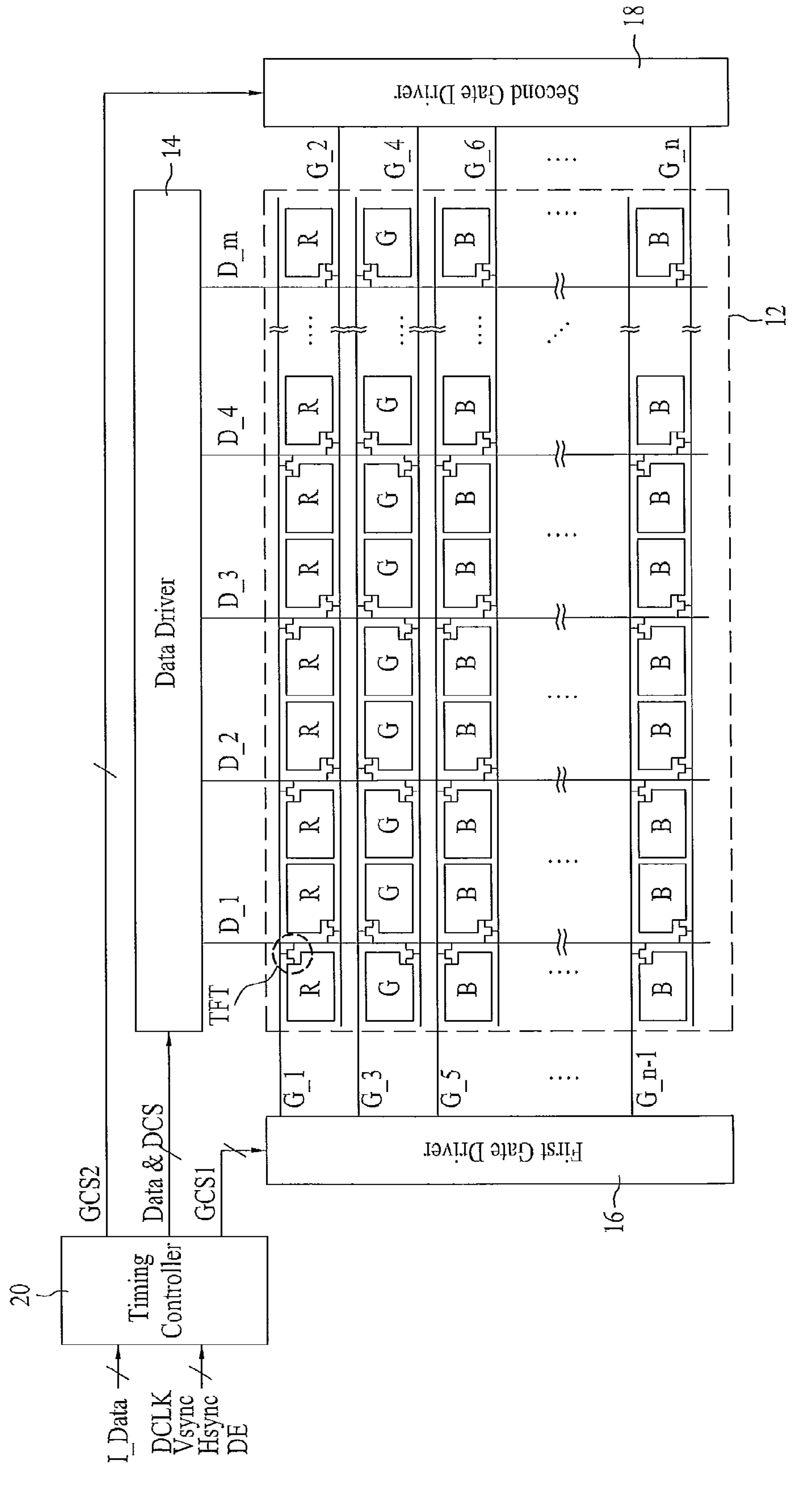
FIG. 6 illustrates the construction of a liquid crystal display device according to a second exemplary embodiment of the present invention.

FIG. 6 illustrates the construction of a liquid crystal display device according to a second exemplary embodiment of the present invention.

The liquid crystal display device of FIG. 6 includes a liquid crystal panel 12, a data driver 14, a first gate driver 16, a second gate driver 18, and a timing controller 20. In the liquid crystal panel 12, three sub-pixels R, G, and B are configured such that the same colors are arranged in the directions of odd gate lines G_1, G_3, G_5, . . . , G_n−1 and even gate lines G_2, G_4, G_6, . . . , G_n, three colors are alternately arranged in the directions of a plurality of data lines D_1 to D_m, and sub-pixels arranged in an odd column and sub-pixels arranged in an even column corresponding to the odd column are commonly connected to one data line. The data driver 14 drives the plurality of data lines D_1 to D_m provided in the liquid crystal panel 12. The first gate driver 16 sequentially drives the odd gate lines G_1, G_3, G_5, . . . , G_n−1 among the gate lines G_1 to G_n during odd frame periods. The second gate driver 18 sequentially drives the even gate lines G_2, G_4, G_6, . . . , G_n among the gate lines G_1 to G_n during even frame periods. The timing controller 20 arranges externally input image data I_Data according to odd and even frame periods to supply the arranged data to the data driver 14, and generates first and second different gate control signals GCS1 and GCS2 and a data control signal DCS according to odd and even frame periods to supply the gate control signals GCS1 and GCS2 and the data control signal DCS to the first and second gate drivers 16 and 18 and the data driver 14, respectively.

A plurality of sub-pixels constituting a pixel matrix of the liquid crystal panel 12 are divided into red, green, and blue sub-pixels R, G, and B and are formed in regions defined by the plurality of data line D_1 to D_m and the plurality of gate lines G_1 to G_n.

In the second exemplary embodiment of the present invention, the odd gate lines G_1, G_3, G_5, . . . , G_n−1 and the even gate lines G_2, G_4, G_6, . . . , G_n form respective pairs. Thus sub-pixels of the same color constituting one horizontal row are arranged between gate lines constituting a pair, that is, between the odd gate line and the even gate line G_1 and G_2, G_3 and G_4, G_5 and G_6, . . . , G_n−1and G_n and are connected to one of the odd gate line and the even gate line G_1 and G_2, G_3 and G_4, G_5 and G_6, . . . , G_n−1 and G_n.

A pair of sub-pixels connected to the same data line in the horizontal row of the same color, that is, a sub-pixel of an odd column and a sub-pixel of an even column connected to the same data line are connected to different gate lines among pairs of gate lines G_1 and G_2, G_3 and G_4, G_5 and G_6, . . . , G_n−1 and G_n and are sequentially driven in units of even and odd frames. More specifically, sub-pixels of odd columns located in odd rows are connected to the odd gate lines G_1, G_5, . . . G_n−3 and sub-pixels of even columns located in odd rows are connected to the even gate lines (G_2, G_6, . . . G_n−2). Sub-pixels of even columns located in even rows are connected to the odd gate lines G_3, G_7, . . . , Gn_1 and sub-pixels of odd columns located in even rows are connected to the odd gate lines G_4, G_8, . . . G_n.

Each of the data lines D_1 to D_m is commonly connected to sub-pixels of an odd column and an even column located at both sides thereof. In other words, each of the data lines D_1 to D_m is connected through corresponding TFTs to sub-pixels of an odd column located adjacently on the left thereof and is connected through corresponding TFTs to sub-pixels of an even column located adjacently on the right side thereof.

Sub-pixels of an odd column and sub-pixels of an even column connected to one data line are respectively connected to different gate lines, that is, odd and even gate lines G_1 to G_n through corresponding TFTS and are driven in units of an odd or even frame.

To reduce power consumption as in the liquid crystal panel 2 of the first exemplary embodiment, the liquid crystal panel 12 of the second exemplary embodiment is driven by an inversion driving mode for odd and even frames in which polarity of data is inverted in units of odd and even frames. Then, sub-pixels connected to the odd gate lines G_1, G_3, G_5, . . . , G_n−1 charge data of the same polarity during odd frame periods and sub-pixels connected to the even gate lines G_2, G_4, G_6, . . . , G_n charge data of the same polarity during even frame periods. The polarity of data is inverted according to each frame period during odd and even frame periods.

The data driver 14 of the second exemplary embodiment is the same as the data driver 4 of the first exemplary embodiment. Accordingly, for a detailed description of the data driver 14, reference may be made to the description of the data driver 4 given above.

The first gate driver 16 sequentially generates a scan pulse in response to the first gate control signal GCS1 which is input every odd frame period from the timing controller 10. The first gate driver 16 sequentially supplies the sequentially generated scan pulse to the odd gate lines G_1, G_3, G_5, . . . , G_n−1 connected thereto.

The second gate driver 18 sequentially generates a scan pulse in response to the second gate control signal GCS2 which is input every even frame period from the timing controller 10. The second gate driver 18 sequentially supplies the sequentially generated scan pulse to the even gate lines G_2, G_4, G_6, . . . , G_n connected thereto.

The timing controller 20 arranges image data which is to be displayed during odd frames among the externally input image data I_Data, that is, image data displayed during odd frames through the sub-pixels connected to the odd gate lines G_1, G_3, G_5, . . . , G_n−1 and supplies the arranged data to the data driver 14 so that the data can be displayed during the odd frames. Moreover, the timing controller 10 arranges image data which is to be displayed during even frames among the input image data I_Data, that is, image data displayed during even frames through the sub-pixels connected to the even gate lines G_2, G_4, G_6, . . . , G_n and supplies the arranged data to the data driver 14 so that the data can be displayed during the even frames. The timing controller 20 generates the data control signal DCS together with the first and second gate control signals GCS1 and GCS2, using at least one externally input synchronous signal. Thereafter, the timing controller 20 supplies the data control signal DCS along with the first and second gate control signals GCS1 and GCS2 to the data driver 14 along with the first and second gate drivers 16 and 18 and controls the data driver 14 along with the first and second gate drivers 16 and 18. For a detailed description of the timing controller 20, reference may be made to the description of the timing controller 10 of the first exemplary embodiment.

Figure 7:
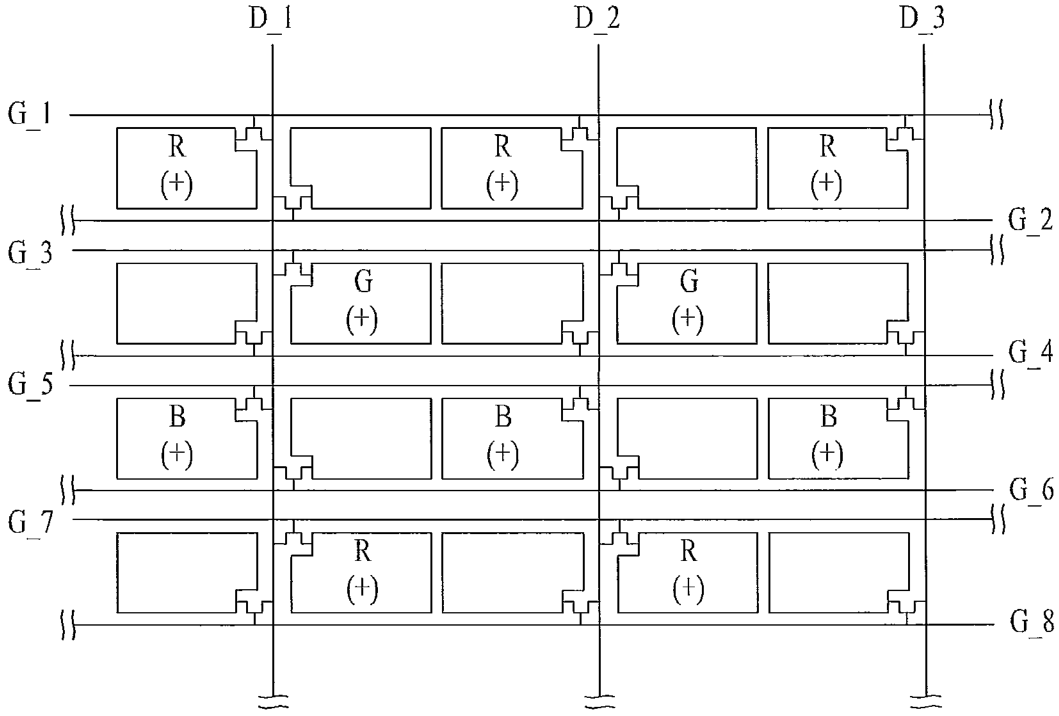
FIG. 7 illustrates sub-pixels data-charged during odd frame periods according to a second exemplary embodiment of the present invention.

FIG. 7 illustrates sub-pixels data-charged during odd frame periods according to a second exemplary embodiment of the present invention.

As shown in FIG. 7, sub-pixels to which a gate-on voltage is supplied through the first gate line G_1 among sub-pixels R arranged in a horizontal row of the uppermost stage charge a red image signal supplied to the data lines D_1 to D_m. Next, sub-pixels to which the gate-on voltage is supplied through the third gate line G_3 among sub-pixels G arranged in a horizontal row of the second stage charge a green image signal supplied to the data lines D_1 to D_m. Thereafter, sub-pixels to which the gate-on voltage is supplied through the fifth gate line G_5 among sub-pixels B arranged in a horizontal row of the third stage charge a blue image signal supplied to the data lines D_1 to D_m. In this way, during odd frame periods, sub-pixels connected to the odd gate lines G_1, G_3, G_5, . . . , G_n−1 to which the gate-on voltage is sequentially supplied charge the image signals of odd frames sequentially, thereby displaying images.

Figure 8:
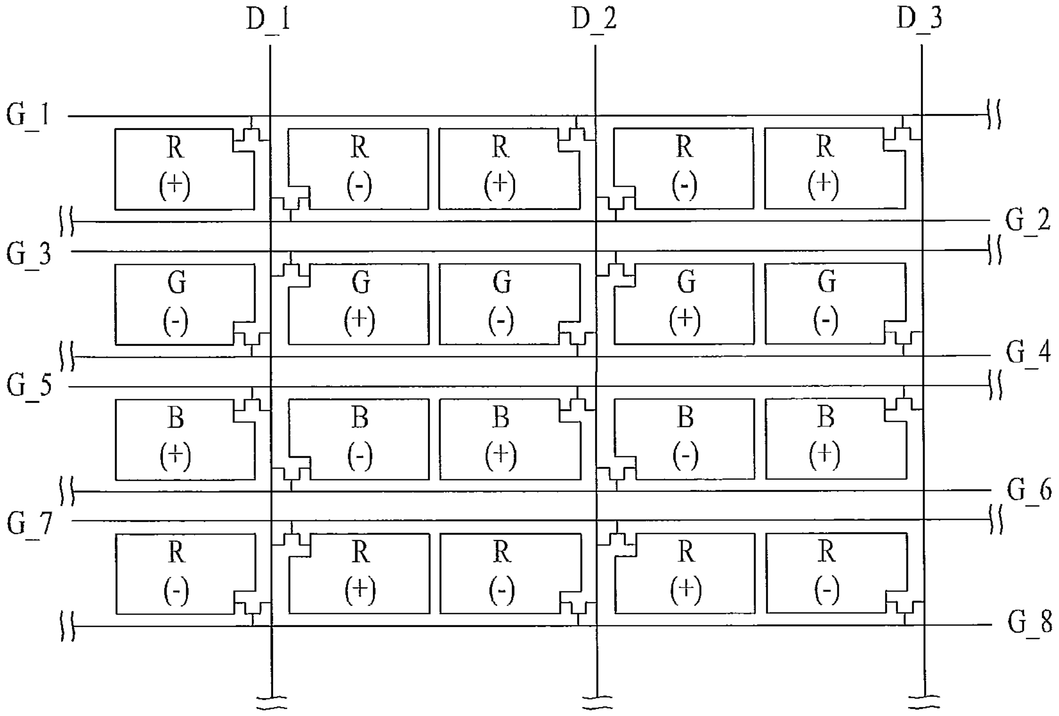
FIG. 8 illustrates sub-pixels data-charged during even frame periods according to a second exemplary embodiment of the present invention.

FIG. 8 illustrates sub-pixels data-charged during even frame periods according to a second exemplary embodiment of the present invention.

As shown in FIG. 8, sub-pixels to which a gate-on voltage is supplied through the second gate line G_2 among sub-pixels R arranged in a horizontal row of the uppermost stage charge a red image signal supplied to the data lines D_1 to D_m. Next, sub-pixels to which the gate-on voltage is supplied through the fourth gate line G_4 among sub-pixels G arranged in a horizontal row of the second stage charge a green image signal supplied to the data lines D_1 to D_m. Thereafter, sub-pixels to which the gate-on voltage is supplied through the sixth gate line G_6 among sub-pixels B arranged in a horizontal row of the third stage charge a blue image signal supplied to the data lines D_1 to D_m. In this way, during even frame periods, sub-pixels connected to the even gate lines G_2, G_4, G_6, . . . , G_n to which the gate-on voltage is sequentially supplied charge the image signals of even frames sequentially, thereby displaying images.

As described above, the liquid crystal display device according to the second exemplary embodiment of the present invention is constructed such that the sub-pixels R, G, and B included in the liquid crystal panel 12 have the same color in the directions of the gate lines G_1 to G_n, the three colors are alternately arranged in the directions of data lines D_1 to D_m, and sub-pixels arranged in an odd column and sub-pixels arranged in an even column corresponding to the odd column share one data line. Accordingly, the number of data driving ICs constituting the data driver 14 can be reduced to one third to one sixth that of a conventional liquid crystal panel. In addition, since an effect of performing a dot inversion mode is obtained while performing a frame inversion mode, power consumption is reduced and display quality can be greatly improved.

The driving apparatus of the liquid crystal display device according to the embodiments of the present invention can reduce the number of data driving ICs to one third to one sixth that of a conventional liquid crystal panel. In addition, the driving apparatus and method for the liquid crystal display device of the present invention compensates for the amount of data charge in the liquid crystal panel to improve display quality and changes an inversion mode to reduce power consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a liquid crystal display device, comprising:

a liquid crystal panel in which the same colors of three-color sub-pixels are arranged in the directions of a plurality of gate lines, three colors are alternately arranged in the directions of a plurality of data lines, and sub-pixels arranged in an odd column and sub-pixels arranged in an even column corresponding to the odd column are commonly connected to one data line;

a data driver for driving the plurality of data lines;

a first gate driver for sequentially driving (4n−3)th and (4n)th gate lines among the gate lines during odd frame periods;

a second gate driver for sequentially driving (4n−2)th and (4n−1)th gate lines among the gate lines during even frame periods; and a timing controller for arranging externally input image data according to odd and even frame periods to supply the arranged data to the data driver, and generating different first and second gate control signals and a data control signal according to odd and even frame periods to supply the first and second gate control signals and the data control signal to the first and second gate drivers and the data driver, respectively, wherein sub-pixels of odd columns located in odd rows among the sub-pixels are connected to the (4n−3)th gate line, sub-pixels of odd columns located in even rows are connected to the (4n−1)th gate line, sub-pixels of even columns located in odd rows are connected to the (4n−2)th gate line, and sub-pixels of even columns located in even rows are connected to the (4n)th gate line, wherein the (4n−2)th and (4n−1)th gate lines are disposed between the (4n−3)th and (4n)th gate lines, wherein the timing controller arranges image data displayed during odd frames through the sub-pixels connected to the (4n−3)th and (4n)th gate lines and supplies the arranged data to the data driver so that the data can be displayed during the odd frames, and image data displayed during even frames through the sub-pixels connected to the (4n−2)th and (4n−1)th gate lines and supplies the arranged data to the data driver so that the data can be displayed during the even frames, wherein during the odd frame periods, the sub-pixels connected to the (4n−3)th and (4n)th gate lines to which a gate-on voltage is sequentially supplied charge image signals of the odd frames sequentially, thereby displaying images, and a gate-off voltage is supplied thereto during the even frame periods, wherein during the even frame periods, the sub-pixels connected to the (4n−2)th and (4n−1)th gate lines to which a gate-on voltage is sequentially supplied charge image signals of the even frames sequentially, thereby displaying images, and a gate-off voltage is supplied thereto during the odd frame periods, wherein the sub-pixels arranged in the odd columns include a first set of R sub-pixel, G sub-pixel, and B sub-pixel arranged in order in the direction of the one data line and connected to the one data line, and include a third set of R sub-pixel, G sub-pixel, and B sub-pixel arranged in order in the direction of the one data line and connected to another data line that is immediately adjacent to the one data line, wherein the sub-pixels arranged in the even columns include a second set of R sub-pixel, G sub-pixel, and B sub-pixel arranged in order in the direction of the one data line and connected to the one data line, wherein the R sub-pixel, G sub-pixel, and B sub-pixel of the first set and the R sub-pixel, G sub-pixel, and B sub-pixel of the second set are arranged respectively side-by-side on opposites sides of the one data line, wherein the R sub-pixel, G sub-pixel, and B sub-pixel of the second set and the R sub- pixel, G sub-pixel, and B sub-pixel of the third set are arranged respectively side-by-side between the one data line and the another data line, wherein the R sub-pixel of the second set and the R sub-pixel of the third set are bounded between the one data line and the another data line, and between the (4n−3)th gate line and the (4n−2)th gate line, wherein each of the R sub-pixel, G sub-pixel, and B sub-pixel of the first set is connected to a different gate line, wherein the (4n−3)th gate line and the (4n)th gate line are first group gate lines. and the (4n−2)th gate line and the (4n−1)th gate line are second group gate lines, and wherein the sub-pixels connected to the first group gate lines (the (4n−3)th gate line and the (4n)th gate line)

charge data of the same polarity during the odd frame periods, and the sub-pixels connected to the second group gate lines (the (4n−2)th gate line and the (4n−1)th gate line) charge data of the same polarity during the even frame periods.

2. The apparatus according to claim 1, wherein the (4n−3)th and (4n−2)th gate lines form one pair, and the (4n−1)th and (4n)th gate lines form another pair to arrange the plurality of sub-pixels between the (4n−3)th gate line and the (4n−2)th gate line, and between the (4n−1)th gate line and the (4n)th gate line.

3. The apparatus according to claim 2, wherein the liquid crystal panel is driven by an inversion driving mode for odd and even frames in which polarity of data is inverted in units of odd and even frames to invert the polarity of data according to each frame period during the odd and even frame periods.

4. A method for driving a liquid crystal display device including a liquid crystal panel in which the same colors of three-color sub-pixels are arranged in the directions of a plurality of gate lines, three colors are alternately arranged in the directions of a plurality of data lines, sub-pixels arranged in an odd column and sub-pixels arranged in an even column corresponding to the odd column are commonly connected to one data line, and a timing controller for arranging externally input image data according to odd and even frame periods to supply the arranged data to the data driver, and generating different first and second gate control signals and a data control signal according to odd and even frame periods to supply the first and second gate control signals and the data control signal to the first and second gate drivers and the data driver, the method comprising:

driving the plurality of data lines;

sequentially driving (4n−3)th and (4n)th gate lines among the gate lines during odd frame periods;

sequentially driving (4n−2)th and (4n−1)th gate lines among the gate lines during even frame periods; and arranging externally input image data according to odd and even frame periods to supply the arranged data to a data driver, and generating different first and second gate control signals and a data control signal according to odd and even frame periods to supply the first and second gate control signals and the data control signal to first and second gate drivers and the data driver, respectively, wherein sub-pixels of odd columns located in odd rows among the sub-pixels are connected to the (4n−3)th gate line, sub-pixels of odd columns located in even rows are connected to the (4n−1)th gate line, sub-pixels of even columns located in odd rows are connected to the (4n−2)th gate line, and sub-pixels of even columns located in even rows are connected to the (4n)th gate line, wherein the (4n−2)th and (4n−1)th gate lines are disposed between the (4n−3)th and (4n)th gate lines, wherein the timing controller arranges image data displayed during odd frames through the sub-pixels connected to the (4n−3)th and (4n)th gate lines and supplies the arranged data to the data driver so that the data can be displayed during the odd frames, and image data displayed during even frames through the sub-pixels connected to the (4n−2)th and (4n−1)th gate lines and supplies the arranged data to the data driver so that the data can be displayed during the even frames, wherein during the odd frame periods, the sub-pixels connected to the (4n−3)th and (4n)th gate lines to which a gate-on voltage is sequentially supplied charge image signals of the odd frames sequentially, thereby displaying images, and a gate-off voltage is supplied thereto during the even frame periods, wherein during the even frame periods, the sub-pixels connected to the (4n−2)th and (4n−1)th gate lines to which a gate-on voltage is sequentially supplied charge image signals of the even frames sequentially, thereby displaying images, and a gate-off voltage is supplied thereto during the odd frame periods, wherein the sub-pixels arranged in the odd columns include a first set of R sub-pixel, G sub-pixel, and B sub-pixel arranged in order in the direction of the one data line and connected to the one data line, and include a third set of R sub-pixel, G sub-pixel, and B sub-pixel arranged in order in the direction of the one data line and connected to another data line that is immediately adjacent to the one data line, wherein the sub-pixels arranged in the even columns include a second set of R sub-pixel, G sub-pixel, and B sub-pixel arranged in order in the direction of the one data line and connected to the one data line, wherein the R sub-pixel, G sub-pixel, and B sub-pixel of the first set and the R sub-pixel, G sub-pixel, and B sub-pixel of the second set are arranged respectively side-by-side on opposites sides of the one data line, wherein the R sub-pixel, G sub-pixel, and B sub-pixel of the second set and the R sub-pixel, G sub-pixel, and B sub-pixel of the third set are arranged respectively side-by-side between the one data line and the another data line, wherein the R sub-pixel of the second set and the R sub-pixel of the third set are bounded between the one data line and the another data line, and between the (4n−3)th gate line and the (4n−2)th gate line, wherein each of the R sub-pixel, G sub-pixel, and B sub-pixel of the first set is connected to a different gate line, wherein the (4n−3)th gate line and the (4n)th gate line are first group gate lines, and the (4n−2)th gate line and the (4n−1)th gate line are second group gate lines, and wherein the sub-pixels connected to the first group gate lines (the (4n−3)th gate line and the (4n)th gate line) charge data of the same polarity during the odd frame periods, and the sub-pixels connected to the second group gate lines (the (4n−2)th gate line and the (4n−1)th gate line) charge data of the same polarity during the even frame periods.

5. The apparatus according to claim 1, wherein the (4n−2)th gate line and the (4n−1)th gate line are disposed immediately adjacent to each other so that the sub-pixels are not arranged between the (4n−2)th gate line and the (4n−1)th gate line.

6. The method according to claim 4, wherein the (4n−2)th gate line and the (4n−1)th gate line are disposed immediately adjacent to each other so that the sub-pixels are not arranged between the (4n−2)th gate line and the (4n−1)th gate line.

* * * * *